United States Patent
VanBlon et al.

(10) Patent No.: US 9,578,513 B2
(45) Date of Patent: Feb. 21, 2017

(54) IDENTIFYING UNTRUSTED NETWORK ACCESS POINTS

(71) Applicant: LENOVO (Singapore) PTE, LTD., New Tech Park (SG)

(72) Inventors: Russell Speight VanBlon, Raleigh, NC (US); John Carl Mese, Cary, NC (US); Nathan J. Peterson, Durham, NC (US); Arnold S. Weksler, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 79 days.

(21) Appl. No.: 14/488,158

(22) Filed: Sep. 16, 2014

(65) Prior Publication Data

US 2016/0080378 A1    Mar. 17, 2016

(51) Int. Cl.
*H04M 1/66* (2006.01)
*H04W 12/12* (2009.01)
*H04W 4/02* (2009.01)
*H04W 64/00* (2009.01)

(52) U.S. Cl.
CPC ............ *H04W 12/12* (2013.01); *H04W 4/02* (2013.01); *H04W 64/003* (2013.01)

(58) Field of Classification Search
CPC .. H04W 56/0005; H04W 12/08; H04W 48/16; H04W 56/0045; H04W 74/006
USPC ......... 455/26.1, 410–415, 456.4, 550.1, 565; 726/2–7, 17–19, 21, 26–30
See application file for complete search history.

(56) References Cited

U.S. PATENT DOCUMENTS

| | | | |
|---|---|---|---|
| 2009/0235354 A1* | 9/2009 | Gray | H04L 63/1416 726/22 |
| 2012/0076117 A1* | 3/2012 | Montemurro | H04W 48/16 370/338 |
| 2015/0051975 A1* | 2/2015 | Kadous | G06Q 30/0261 705/14.58 |

* cited by examiner

*Primary Examiner* — Ronald Eisner
(74) *Attorney, Agent, or Firm* — Kunzler Law Group

(57) ABSTRACT

An apparatus, method and program product are provided that determines a location associated with a network access point, the network access point being identified by an access point identifier, receives access point data from a mapping service, the access point data corresponding to the location of the network access point, and connects the network adaptor to the network access point in response to verifying that the access point data comprises an access point identifier that matches the access point identifier associated with the network access point.

18 Claims, 5 Drawing Sheets

IDENTIFYING UNTRUSTED NETWORK ACCESS POINTS

FIELD

The subject matter disclosed herein relates to computer networking and more particularly relates to managing untrusted network access points.

BACKGROUND

Description of the Related Art

Mobile electronic devices, such as smart phones, tablet computers, and laptop computers, may connect to networks in a variety of places, such as at work, at school, at home, at a coffee shop, etc. The mobile electronic devices may interface with a network access point, such as a wireless access point, in order to access data on a network. With the advent of mobile electronic devices with wireless networking capabilities, the number of wireless network access points has increased as well. Consequently, fraudsters may set up network access points that appear to be legitimate network access points by spoofing a legitimate network access point in order to misappropriate data from a user connected to the spoofed network access point. It may be difficult to determine whether a network access point is a legitimate network access point or a fraudulent network access point.

BRIEF SUMMARY

An apparatus for identifying untrusted network access points is disclosed. A method and computer program product also perform the functions of the apparatus. In one embodiment, an apparatus includes a network adapter that connects to a network access point, a processor operatively coupled to the network adaptor, and a memory that stores code executable by the processor. In certain embodiments, the apparatus includes code that determines a location associated with a network access point. In some embodiments, the network access point is identified by an access point identifier. In one embodiment, the apparatus includes code that receives access point data from a mapping service. In some embodiments, the access point data corresponds to the location of the network access point.

In a further embodiment, the apparatus includes code that connects the network adaptor to the network access point in response to verifying that the access point data comprises an access point identifier that matches the access point identifier associated with the network access point. In one embodiment, the apparatus includes code that associates an access point identifier with a user's location. In certain embodiments, the network adapter is connected to a network access point at the user's location in response to the network access point having an access point identifier that matches the access point identifier associated with the user's location.

In one embodiment, the apparatus includes code that determines usage data for the network access point. In certain embodiments, the usage data includes a number of users connected to the network access point. In one embodiment, the network adapter is connected to the network access point in response to the number of users connected to the network access point exceeding a predetermined threshold. In some embodiments, the apparatus includes code that determines an amount of time that the access point identifier has been active at the location associated with the network access point. In a further embodiment, the network adapter is connected to the network access point in response to the amount of time exceeding a predetermined threshold.

In one embodiment, the mapping service comprises access point data for a plurality of trusted network access points. In some embodiments, a trusted network access point is registered with the mapping service. In certain embodiments, the apparatus includes code that downloads access point data from the mapping service such that the access point data is accessible while not connected to a data network. In a further embodiment, the access point data is received from the mapping service using a secondary data network, which may comprise a cellular data network. In certain embodiments, the access point identifier comprises a service set identifier (SSID). In some embodiments, the access point identifier comprises a media access control (MAC) address. In a further embodiment, the location is selected from the group consisting of a global positioning system (GPS) coordinate, a latitude/longitude pair, and an address.

A method is included that, in one embodiment, determines, by use of a processor, a location associated with a network access point. In some embodiments, the network access point is identified by an access point identifier. In a further embodiment, the method includes receiving access point data from a mapping service. In one embodiment, the access point data corresponds to the location of the network access point. In some embodiments, the method includes connecting a network adapter to the network access point in response to verifying that the access point data comprises an access point identifier that matches the access point identifier associated with the network access point.

In one embodiment, the method includes associating an access point identifier with a user's location. In some embodiments, the network adapter is connected to a network access point at the user's location in response to the network access point having an access point identifier that matches the access point identifier associated with the user's location. In a further embodiment, the method includes determining usage data for the network access point. In certain embodiments, the usage data includes a number of users connected to the network access point. In one embodiment, the network adapter is connected to the network access point in response to the number of users connected to the network access point exceeding a predetermined threshold.

In certain embodiments, the method includes determining an amount of time that the access point identifier has been active at the location associated with the network access point. In some embodiments, the network adapter is connected to the network access point in response to the amount of time exceeding a predetermined threshold. In a further embodiment, the mapping service comprises access point data for a plurality of trusted network access points. In a further embodiment, a trusted network access point is registered with the mapping service.

In one embodiment, the method includes downloading access point data from the mapping service such that the access point data is accessible while not connected to a data network. In a further embodiment, the access point data is received from the mapping service using a secondary data network, which may include a cellular data network. In one embodiment, the access point identifier comprises one or more of a service set identifier (SSID) and a media access control (MAC) address.

A program product is disclosed that, in one embodiment, includes a computer readable storage medium that stores code executable by a processor. In certain embodiments, the executable code includes code that determines a location associated with a network access point. In some embodiments, the network access point is identified by an access point identifier. In a further embodiment, the executable code include code that receives access point data from a mapping service. In one embodiment, the access point data corresponds to the location of the network access point. In a further embodiment, the executable code includes code that connects a network adapter to the network access point in response to verifying that the access point data comprises an access point identifier that matches the access point identifier associated with the network access point. In one embodiment, the access point identifier comprises one or more of a service set identifier (SSID) and a media access control (MAC) address.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
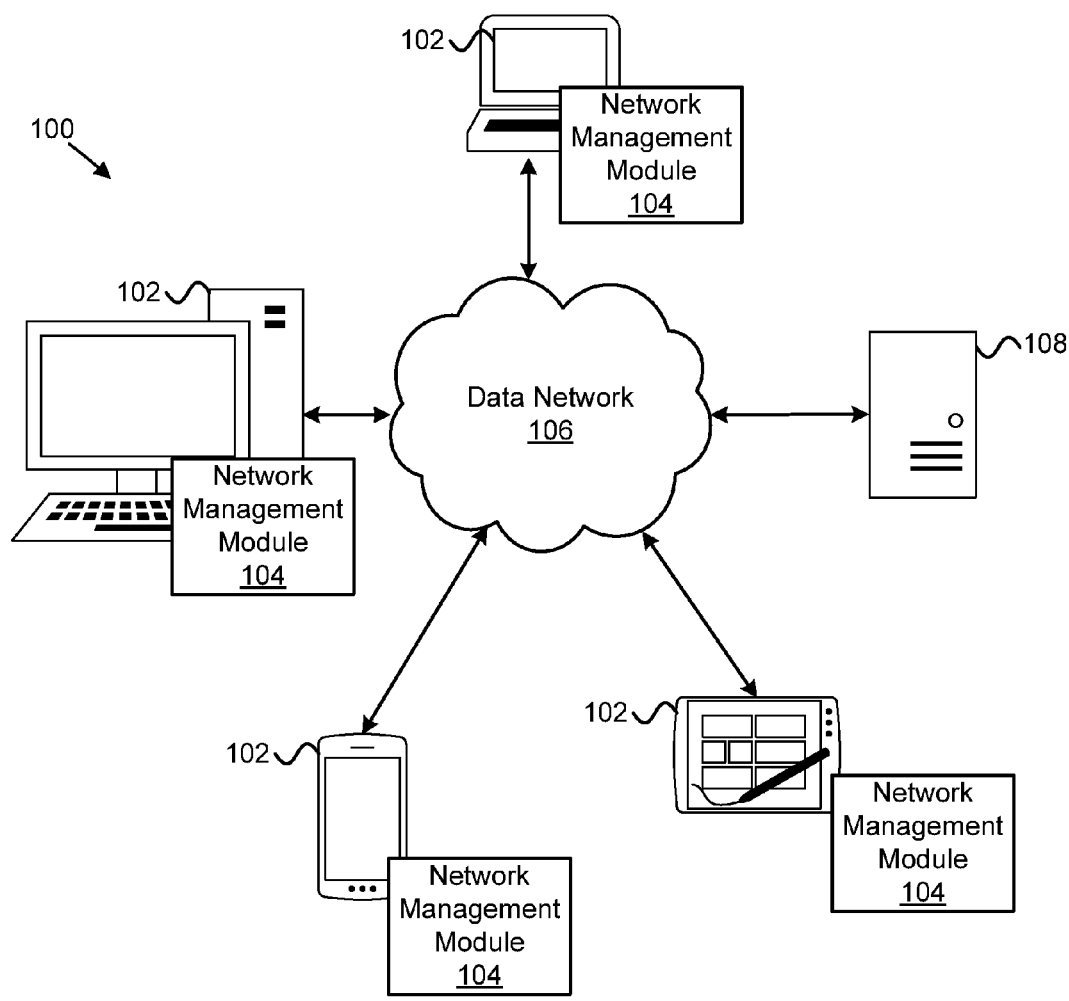
FIG. 1 is a schematic block diagram illustrating one embodiment of a system for identifying untrusted network access points.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts one embodiment of a system 100 for identifying untrusted network access points. In one embodiment, the system 100 includes information handling devices 102, keyboard management modules 104, data networks 106, and servers 108, which are described below in more detail. While a specific number of elements 102-108 of the system 100 are depicted in FIG. 1, any number of elements 102-108 may be included in the system 100 for on-screen keyboard management.

In one embodiment, the information handling devices 102 include electronic computing devices, such as desktop computers, laptop computers, tablet computers, smart televisions, smart phones, servers, and/or the like. The information handling devices 102, in certain embodiments, include one or more network adapters, also known as network interface cards (NICs). As used herein, a network adapter refers to a computer hardware component that connects a computer to a computer network. The network adapter, in one embodiment, comprises a network adapter configured for wireless network communications, such as Wi-Fi, Bluetooth®, or the like. In some embodiments, the network adapter comprises a network adapter configured for wired network communications, such as an ETHERNET adapter.

In certain embodiments, the network adapter is configured to connect to a data network 106, described below, via a network access point. In one embodiment, a network adapter configured for wireless communication connects to a wireless access point to access the data network 106. In such an embodiment, the wireless access point is a device (e.g., a wireless router) that allows wireless devices to connect to a wired network using a wireless communication protocol, such as Wi-Fi, or the like. In certain embodiments, network access points may be considered trusted or untrusted. As used herein, a trusted network access point is a network access point that is deemed to be a safe, secure, and legitimate network access point. A trusted network access point may be setup by a trusted individual, retailer, or the like, unlike an untrusted network access point, which may be established by a fraudster, imposter, or other individual with the purpose of misappropriating a user's data and/or gaining control of a user's device.

In one embodiment, the network management module 104 is configured to determine a location associated with a network access point, which may be identified by an access point identifier. In some embodiments, the network management module 104 receives access point data from a mapping service that corresponds to the location of the network access point. In certain embodiments, the network management module 104 connects the network adapter to the network access point in response to verifying that the access point data comprises an access point identifier that matches the access point identifier associated with the network access point.

The data network 106, in one embodiment, comprises a digital communication network that transmits digital communications. The data network 106 may include a wireless network, such as a wireless cellular network, a local wireless network, such as a Wi-Fi network, a Bluetooth® network, a near-field communication (NFC) network, an ad hoc network, and/or the like. The data network 106 may include a wide area network (WAN), a storage area network (SAN), a local area network (LAN), an optical fiber network, the Internet, an internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, random access memory (RAM), or the like.

In one embodiment, the system 100 includes a server 108. The server 108 may be embodied as a desktop computer, a laptop computer, a mainframe, a cloud server, a virtual machine, or the like. In some embodiments, the information handling devices 102 are communicatively coupled to the server 108 through the data network 106. The server 108 may include data accessible by an information handling device 102 through the data network 106, such as map data, access point data, and/or the like. The server 108, in some embodiments, may be configured as a file server, media server, email server, game server, and/or the like.

Figure 2:
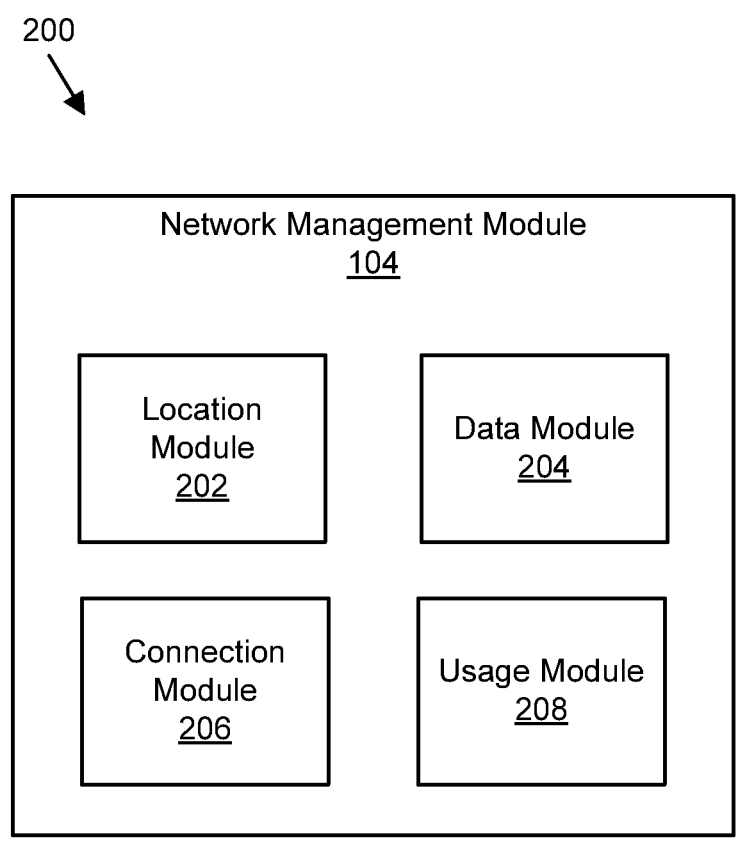
FIG. 2 is a schematic block diagram illustrating one embodiment of a module for identifying untrusted network access points.

FIG. 2 depicts one embodiment of a module 200 for identifying untrusted network access points. In one embodiment, the module 200 comprises an embodiment of a network management module 104. In certain embodiments, the network management module 104 includes a location module 202, a data module 204, a connection module 206, and a usage module 208, which are described in more detail below.

In one embodiment, the location module 202 determines a location associated with a network access point. A location may comprise an address, a global positioning system (GPS) coordinate, a latitude/longitude pair, or the like. In certain embodiments, the location module 202 receives the location associated with the network access point from the network access point. For example, the network access point may be in communication with the location module 202, and may send the location module 202 its location periodically, such as the first time the network access point is activated and every day, week, month, or the like thereafter. In such an embodiment, the location module 202 may be located on an information handling device 102 of a user, such as a laptop computer or a smart phone, and may be in communication with the network access point. In certain embodiments, the network access point sends the location module 202 its location in response to the location module 202 being within a predetermined proximity of the network access point. In some embodiments, the network access point may broadcast its location.

In some embodiments, the location module 202 determines a location of a network access point based on the user's location. In certain embodiments, the user may be within a close proximity of the network access point such that the location of the user is substantially similar to the location of the network access point. For example, the user may be located in a coffee shop that has a wireless network access point, and the location module 202 may use the user's location, or, more specifically, the location of the user's device, as the location of the network access point. In certain embodiments, the location module 202 uses a location associated with the user in response to being unable to determine the location of the network access point, such as in situations where the network access point does not broadcast its location or does not send it to devices trying to connect to the network access point.

In certain embodiments, the network access point is identified by an access point identifier. In certain embodiments, the network access point identifier comprises a service set identifier (SSID), which, as used herein, is a human-readable name of a wireless local area network (WLAN). In certain embodiments, the network access point broadcasts the SSID for the WLAN such that devices that desire to connect to the WLAN can discover the network access point by its SSID. For example, a tablet computer may discover one or more WLANs within a close proximity of the tablet computer, and may list the available WLANs by their associated SSIDs such that a user may select which network access point to connect to based on the SSIDs.

In some embodiments, however, SSIDs are not unique identifiers, meaning that more than one network access point could use the same SSID as an identifier. Unlike SSIDs, the network access point identifier may comprise a media access control (MAC) address. As used herein, a MAC address is a unique identifier assigned to network interfaces, such as a network access point (e.g., a wireless router). In certain embodiments, the network access point broadcasts its MAC address to devices within a close proximity of the network access point. In some embodiments, the location module 202 receives the MAC address from the network access point. Other identifiers may be used to identify the network access point, such as an Internet Protocol (IP) address, a vendor specific identifier (e.g., a Cisco® Unique Device Identifier (UDI)), or the like.

In one embodiment, the data module 204 receives access point data from a mapping service. As used herein, a mapping service is a web mapping service application and technology that may provide satellite imagery, street maps, and a locator for different points of interest, such as network access points. Examples of mapping services may include Google Maps®, Yahoo! Maps®, Bing Maps®, or the like. In some embodiments, the mapping service may include access point data that corresponds to the location of the network access point. For example, based on the location of the network access point, as determined by the location module 202, the data module 204 may receive network access data that corresponds to the determined location, such as available network access points at the location, network access point identifiers at the location, and/or the like.

In one embodiment, the access point data received by the data module 204 comprises one or more network access point identifiers for the location (e.g., within a predetermined proximity of the determined location). As described above, the network access point identifiers may comprise an SSID, a MAC address, and/or the like. The network access point identifiers may be displayed on an image of a map for the location, and may be interacted with by a user. For example, user may view the access point data, in particular, the network access point identifiers for the location, on a map of the location, and may select, click, or otherwise interact with the displayed identifiers to view more information regarding the network access point for the identifier, to connect to a network access point for the identifier, and/or the like.

In certain embodiments, the data module 204 receives access point data from a cloud server associated with the mapping service, i.e., a server that is accessible over a network, such as the Internet. For example, the data module 204 may receive the access point data via a Wi-Fi network, a cellular data network, or the like. In some embodiments, the data module 204 downloads and stores access point data such that the access point data is available while not connected to a data network. In this manner, the access point data may still be accessible to a user who is at a location without network access.

In some embodiments, the data module 204 uploads access point data to a cloud server, or other networked storage device, associated with the mapping service. For example, the data module 204 may be located on a network access point and may upload location data from the network access point to the cloud server on a periodic basis. In another example, the data module 204 may be located on a user's smart phone and may upload location data for a network access point. The location may comprise the location of the user's smart phone, which may be substantially similar to the location of the network access point.

In some embodiments, the data module 204 uploads the location of the network access point from a user's device in response to connecting to the network access point. In one embodiment, the data module 204 uploads the location of the network access point in response to the network access point being registered as a trusted network access point. In this manner, the data module 204 limits the location data that is uploaded to the cloud server associated with the mapping service to network access point locations that are trusted by a user or that have been registered as a trusted network access point. In certain embodiments, in addition to the location data, the data module 204 uploads network access point identifiers (SSIDs, MAC addresses, or the like) and other access point data to the cloud server for the mapping service.

In some embodiments, the data module 204 receives access point data for a network access point associated with a retail location, such as a coffee shop or a restaurant. The data module 204 may receive access point data for a retail location in response to a user being within a proximity of the retail location. For example, if a user is near a Starbucks® coffee shop, and is trying to determine information regarding network access points within the area, the data module 204 may receive access point data specifically for the Starbucks® where the user is located in response to the location module 202 determining the location of the user. In some embodiments, if there are a plurality of network access points within the user's proximity, the user may be prompted to provide his location, such as by selecting a retail location on a map, or selecting a location for a pre-populated list of locations within the user's proximity.

In one embodiment, the connection module 206 connects a network adapter to a network access point in response to verifying that the access point data comprises an access point identifier that matches the access point identifier associated with the network access point. As used herein, connecting the network adapter to a network access point may include initiating wired or wireless communications between the network adapter and the network access point. In some embodiments, as used herein, connecting the network adapter to the network access point refers to accessing a network, such as a local area network (LAN), a wide area network (WAN), the Internet, or the like, via the network access point and sending/receiving data on the network via the network access point. Thus, a network adapter may communicate with the network access point, such as by sending/receiving initial communications, but not be connected to the network access point because the network that the network access point is connected to is not yet accessible.

In certain embodiments, the connection module 206 receives one or more access point identifiers from the access point data and verifies that one of the access point identifiers for the location matches the access point identifier for the network access point that the user is connecting to. For example, based on the user's location at a Starbucks®, the data module 204 may receive access point data for the location that includes an access point identifier, e.g., an SSID of "Starbucks WIFI." The connection module 206, in such an example, connects the network adapter for the user's device to the network access point if the network access point has the same SSID, "Starbucks WIFI." If the network access point does not have the same SSID for that location, e.g., "Starbucks Network," then the connection module 206 may prevent the network adapter from connecting to the network access point because the network access point has not been verified as a trusted network access point.

In some embodiments, a user's device may remember the access point identifier for a particular network access point. For example, a device that connects to a network access point at a Starbucks® may remember the SSID, e.g., "Starbucks WIFI," for the network access point for future reference. Sometimes, however, fraudsters may attempt to spoof network access points using common or known access point identifiers in an attempt to connect to devices that store network access point identifiers. In such an embodiment, before the device is allowed to connect to the network access point, the connection module 206 verifies that the access point data for that location comprises an access point identifier that matches the access point identifier of the spoofed network access point.

For example, a fraudster driving around a neighborhood may spoof a trusted network access point by broadcasting a known SSID, such as an SSID for a local Starbucks®, "Starbucks WIFI." A user's smart phone that saved the SSID from a previous connection to the Starbucks® Wi-Fi network access point, "Starbucks WIFI," may attempt to connect to the spoofed network access point because the SSIDs are the same. Before connecting the smart phone to the spoofed network access point, however, the location module 202 determines the location of the spoofed network access point, the data module 204 receives access point data from a mapping service that corresponds to the determined location, and the connection module 206 verifies that the access point data comprises an SSID for that location that matches the SSID of the spoofed access point before connecting the smart phone to the network access point. In this case, the connection module 206 may prevent the smart phone from connecting to the spoofed network access point if the access point data does not include an SSID for the location of the spoofed network access point that matches the SSID of the spoofed network access point.

In some embodiments, the access point identifier may comprise an SSID and a MAC address pair. For example, in the previous situation, if the access point data for a location of a spoofed network access point included an SSID that matched the SSID of the spoofed network access point, the connection module 206 may further verify that a MAC address for the spoofed network access point matches a MAC address for a network access point for the determined location before connecting the network adapter to the network access point.

In one embodiment, the usage module 208 determines usage data for a network access point. In some embodiments, the usage data comprises a number of users that are connected to a network access point. In certain embodiments, the usage module 208 receives usage data from a network access point. In some embodiments, the network access point broadcasts the usage data such that the usage module 208 may discover and receive the data. In certain embodiments, if the connection module 206 does not verify the access point data comprises an access point identifier that matches the access point identifier associated with the network access point, the connection module 206 may connect the network adapter to the network access point in response to the number of users connected to the network access point exceeding a predetermined threshold.

For example, if a Starbucks® coffee shop recently replaced its network access point with a new network access point that has a new SSID or MAC address, it may not yet be associated with the mapping service as a trusted network access point (e.g., it may not have been registered yet) at that particular location. Consequently, if a user attempts to connect to the network access point, the data module 204 may receive access point data for the location determined by the location module 202, and the connection module 206 may determine that the access point data does not include an SSID or MAC address that matches the SSID or MAC address of the network access point. However, the usage module 208 may determine that the number of users that have connected to the network access point within the last week is above a predetermined threshold (e.g., 1,000 users). In response to satisfying the predetermined threshold, the connection module 206 may determine that the network access point is a trusted network access point, and may connect the network adapter to the network access point.

In some embodiments, the usage module 208 determines an amount of time that the access point identifier has been active at the location associated with the network access point. Referring back to the previous example, if the new network access point for the Starbucks® location has an SSID or MAC address that has been active for a predetermined period of time, such as two weeks, the connection module 206 may connect the network adapter to the network access point even though the network access point is not verified as a trusted network access point based on the access point data received from the mapping service.

In some embodiments, the connection module 206 may prompt a user for confirmation prior to connecting the network adapter to the network access point. In certain embodiments, the connection module 206 may present a list of recommended network access points within the user's proximity, such as a list of network access points that are determined to be trusted or secure, to the user and receive user input regarding which network access point to connect to prior to connecting to a network access point. For example, the connection module 206 may present a message associated with a recommended network access point that states "The network access point identified by the SSID 'Starbucks WIFI' and the MAC address 12-34-56-78-9A-BC has been active for 6 weeks and has been connected to by 3,234 users. Connect to 'Starbucks WIFI?'" In response to the user's confirmation, the connection module 206 may connect the network adapter to the network access point.

Figure 3:
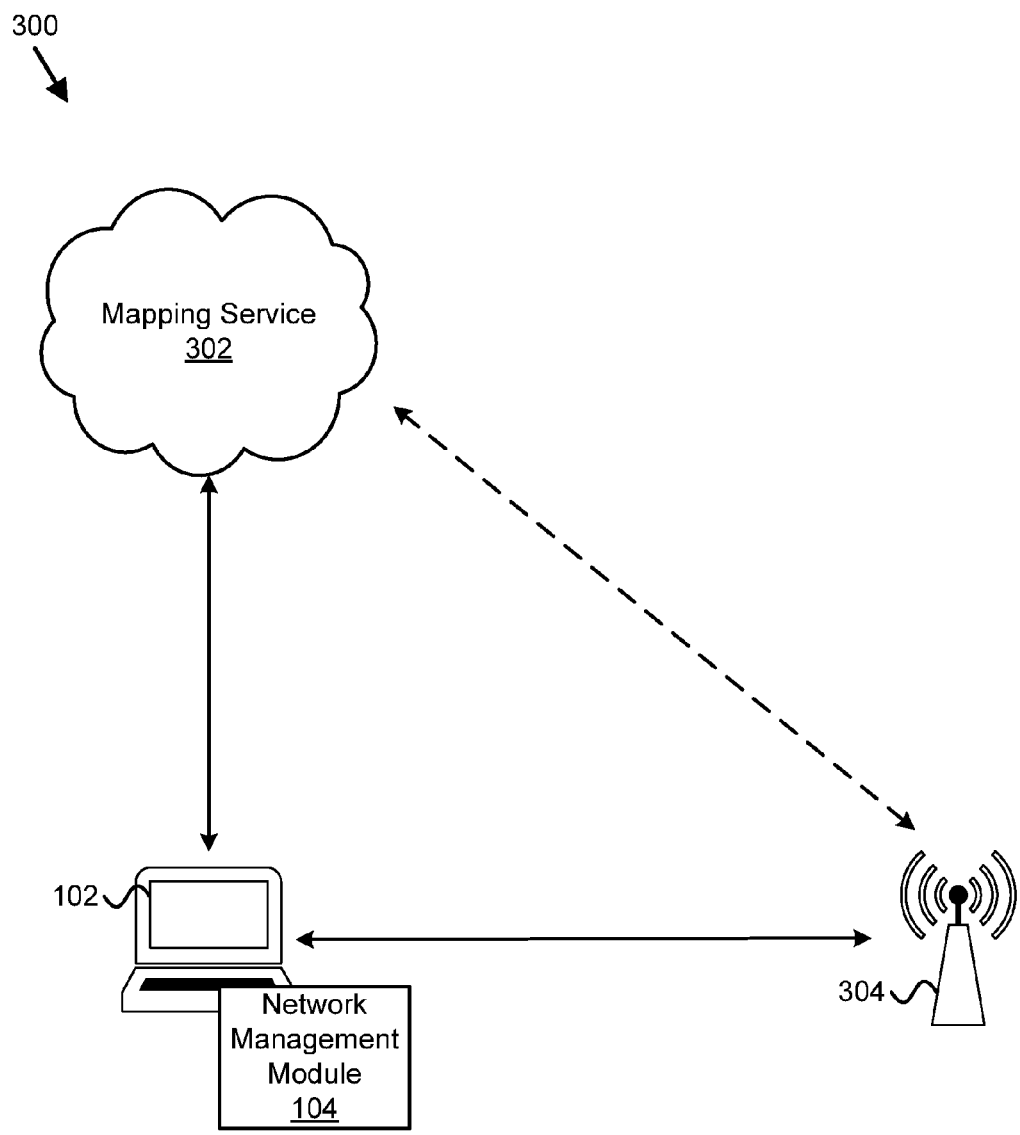
FIG. 3 illustrates one embodiment of identifying untrusted network access points.

FIG. 3 depicts one embodiment 300 of identifying untrusted network access points. In one embodiment, an information handling device 102 comprising a network management module 104 attempts to connect to the network access point 304. The location module 202 may determine the location of the network access point 304. In certain embodiments, the location module 202 receives the location from the network access point. In certain embodiments, the location module 202 uses the location of the user's device as the location of the network access point.

In a further embodiment, the data module 204, based on the location received from the location module 202, receives access point data from a mapping service 302. In some embodiments, the user's device may not be connected to a Wi-Fi network, and, therefore, may use a secondary network, such as a cellular data network, to connect to the mapping service 302. The mapping service 302, in certain embodiments, maintains a cloud server that stores access point identifiers with a corresponding location. In certain embodiments, the a data module 204 located on the network access point 304 uploads location and access point identification information to the mapping service 302, which is stored for future reference. In this manner, the network access point may be registered with the mapping service as a trusted network access point such that its information is associated with its location on any maps provided by the mapping service 302.

The connection module 206 connects the network adapter for the information handling device 102 to the network access point 304 in response to verifying that the access point data received by the data module 204 comprises an access point identifier that matches an access point identifier for the network access point 304. The access point identifier, in certain embodiments, comprises an SSID, a MAC address, and/or the like. In this manner, the network management module 104 verifies that the information handling device 102 is connecting to a trusted, verified network access point and not an untrusted network access point.

Figure 4:
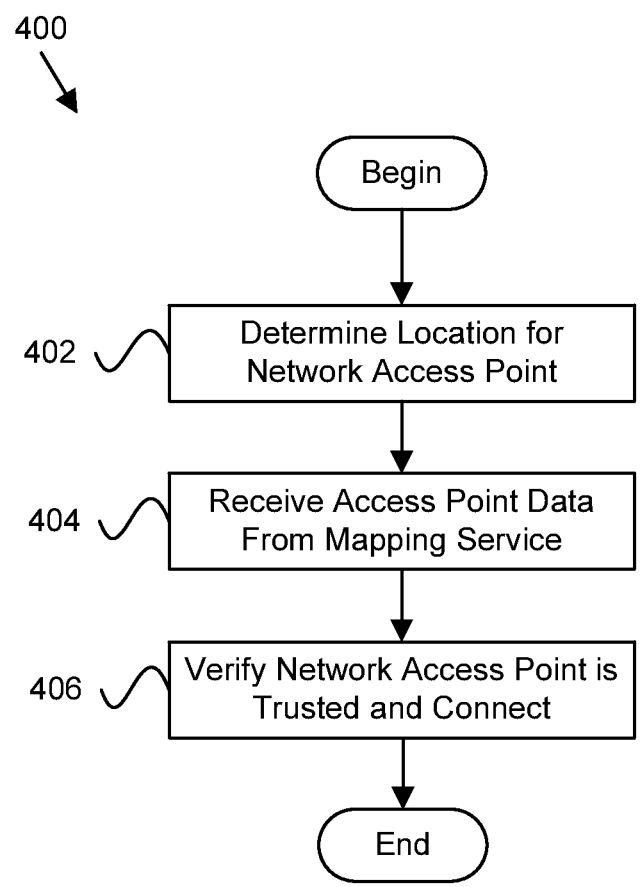
FIG. 4 is a schematic flow chart diagram illustrating one embodiment of a method for identifying untrusted network access points.

FIG. 4 is a schematic flow chart diagram illustrating one embodiment of a method 400 for identifying untrusted network access points. In one embodiment, the method 400 begins and a location module 202 determines 402 a location associated with a network access point. In certain embodiments, the network access point is identified by an access point identifier, such as an SSID or MAC address. In certain embodiments, a data module 204 receives 404 access point data from a mapping service. In some embodiments, the access point data corresponds to the location of the network access point. In a further embodiment, a connection module 206 connects 406 the network adaptor to the network access point in response to verifying that the access point data comprises an access point identifier that matches the access point identifier associated with the network access point, and the method 400 ends.

Figure 5:
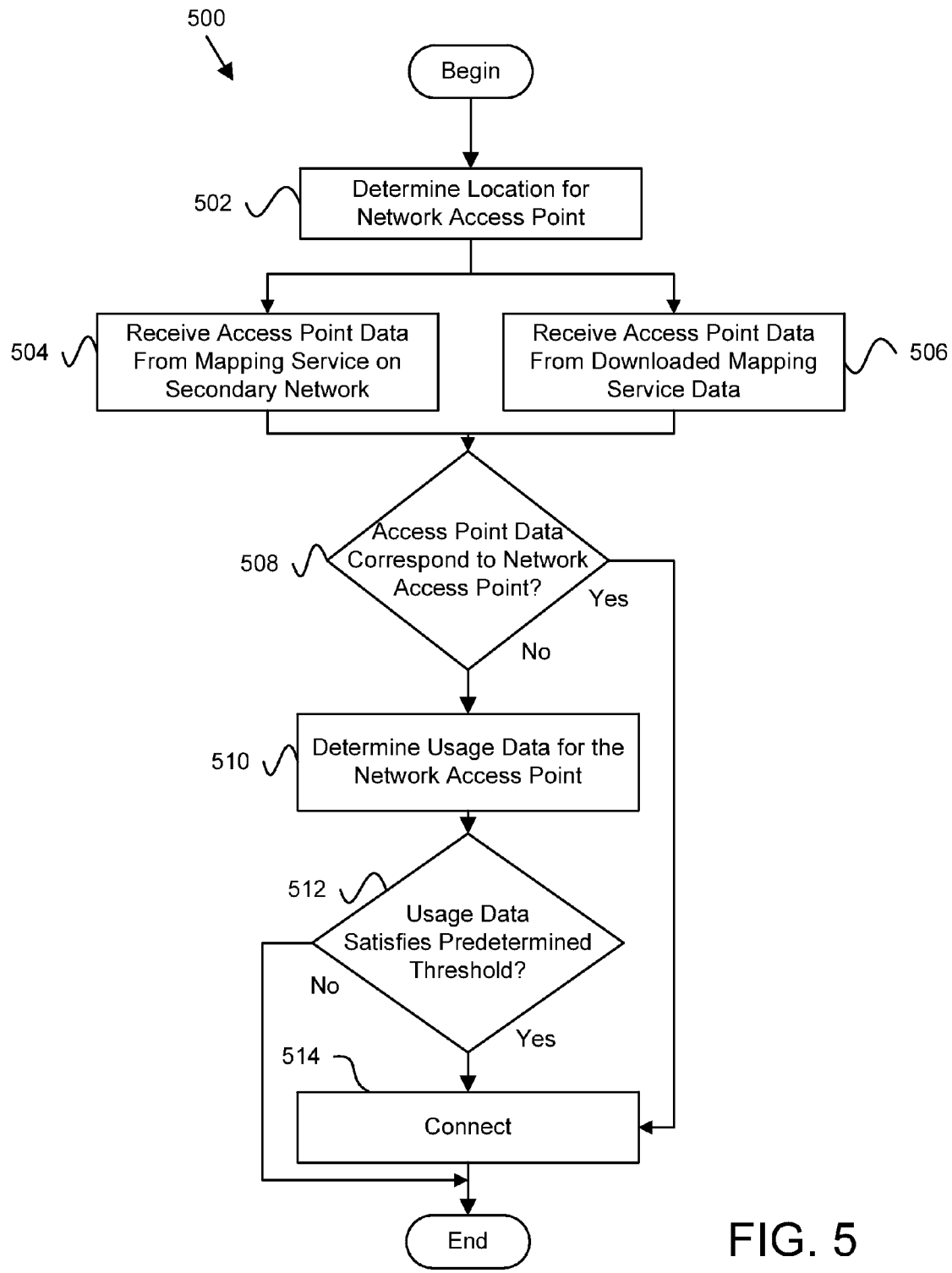
FIG. 5 is a schematic flow chart diagram illustrating another embodiment of a method for identifying untrusted network access points.

FIG. 5 is a schematic flow chart diagram illustrating another embodiment of a method 500 for identifying untrusted network access points. In one embodiment, the method 500 begins and a location module 202 determines 502 a location associated with a network access point, which may have an access point identifier. In one embodiment, the data module 204, based on the location determined by the location module 202, receives 504 access point data from a mapping service on a secondary network, such as a cellular network. In some embodiments, the data module 204 receives 506 access point data from downloaded mapping service data. In one embodiment, the access point data corresponds to the location of the network access point.

In one embodiment, a connection module 206 determines 508 whether the access point data comprises an access point identifier that matches the access point identifier associated with the network access point. If the connection module 206 determines 508 that the access point data comprises an access point identifier that matches the access point identifier associated with the network access point, then the connection module 206 connects 514 the network adapter to the network access point, and the method 500 ends.

In some embodiments, if the connection module 206 determines 508 that the access point data does not comprise an access point identifier that matches the access point identifier associated with the network access point, a usage module 208 determines 510 usage data associated with the network access point, such as the number of users that have connected to the network access point over a predetermined period of time, the amount of time that the access point identifier for the network access point has been active, and/or the like. If the usage module 208 determines 512 that the usage data satisfies a predetermined threshold, the connection module 206 connects 514 the network adapter to the network access point, and the method 500 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a network adaptor that connects to a network access point;
    a processor operatively coupled to the network adaptor;
    a memory that stores code executable by the processor, the code comprising:
        code that determines a location associated with a network access point, the network access point being identified by a first access point identifier;
        code that receives access point data from a mapping service, the access point data corresponding to the location of the network access point;
        code that determines usage data for the network access point, the usage data comprising a number of users connected to the network access point; and
        code that connects the network adaptor to the network access point in response to the number of users connected to the network access point exceeding a predetermined threshold and in response to verifying that the access point data does not comprise a second access point identifier that matches the first access point identifier associated with the network access point.

2. The apparatus of claim 1, further comprising code that associates the second access point identifier with a user's location, wherein the network adapter is connected to a network access point at the user's location in response to the first access point identifier matching the second access point identifier associated with the user's location.

3. The apparatus of claim 1, further comprising code that determines an amount of time that the first access point identifier has been active at the location associated with the network access point, wherein the network adapter is connected to the network access point in response to the amount of time exceeding a predetermined threshold.

4. The apparatus of claim 1, wherein the mapping service comprises access point data for a plurality of trusted network access points, a trusted network access point being registered with the mapping service.

5. The apparatus of claim 1, further comprising code that downloads access point data from the mapping service such that the access point data is accessible while not connected to a data network.

6. The apparatus of claim 1, wherein the access point data is received from the mapping service using a secondary data network, the secondary data network comprising a cellular data network.

7. The apparatus of claim 1, wherein the first access point identifier comprises a service set identifier (SSID).

8. The apparatus of claim 1, wherein the first access point identifier comprises a media access control (MAC) address.

9. The apparatus of claim 1, wherein the location is selected from the group consisting of a global positioning system (GPS) coordinate, a latitude/longitude pair, and an address.

10. A method comprising:
    determining, by use of a processor, a location associated with a network access point, the network access point being identified by a first access point identifier;
    receiving access point data from a mapping service, the access point data corresponding to the location of the network access point;
    determining usage data for the network access point, the usage data comprising a number of users connected to the network access point; and
    connecting a network adapter to the network access point in response to the number of users connected to the network access point exceeding a predetermined threshold and in response to verifying that the access point data does not comprise a second access point identifier that matches the first access point identifier associated with the network access point.

11. The method of claim 10, further comprising associating the second access point identifier with a user's location, wherein the network adapter is connected to a network access point at the user's location in response to the first access point identifier matching the second access point identifier associated with the user's location.

12. The method of claim 10, further comprising determining an amount of time that the first access point identifier has been active at the location associated with the network access point, wherein the network adapter is connected to the network access point in response to the amount of time exceeding a predetermined threshold.

13. The method of claim 10, wherein the mapping service comprises access point data for a plurality of trusted network access points, a trusted network access point being registered with the mapping service.

14. The method of claim 10, further comprising downloading access point data from the mapping service such that the access point data is accessible while not connected to a data network.

15. The method of claim 10, wherein the access point data is received from the mapping service using a secondary data network, the secondary data network comprising a cellular data network.

16. The method of claim 10, wherein the first access point identifier comprises one or more of a service set identifier (SSID) and a media access control (MAC) address.

17. A non-transitory computer readable storage medium that stores code executable by a processor, the executable code comprising code to perform:
- determining a location associated with a network access point, the network access point being identified by a first access point identifier;
- receiving access point data from a mapping service, the access point data corresponding to the location of the network access point;
- determining usage data for the network access point, the usage data comprising a number of users connected to the network access point; and
- connecting a network adapter to the network access point in response to the number of users connected to the network access point exceeding a predetermined threshold and in response to verifying that the access point data does not comprise a second access point identifier that matches the first access point identifier associated with the network access point.

18. The non-transitory computer readable storage medium of claim 17, wherein the first access point identifier comprises one or more of a service set identifier (SSID) and a media access control (MAC) address.

* * * * *